United States Patent
Berkey

[11] Patent Number: 5,180,410
[45] Date of Patent: Jan. 19, 1993

[54] METHOD OF MAKING POLARIZATION RETAINING FIBER

[75] Inventor: George E. Berkey, Pine City, N.Y.
[73] Assignee: Corning Incorporated, Corning, N.Y.
[21] Appl. No.: 560,090
[22] Filed: Jul. 30, 1990
[51] Int. Cl.⁵ .............................. C03B 37/022
[52] U.S. Cl. ..................... 65/3.11; 65/3.12; 65/13; 385/128; 385/146; 427/163
[58] Field of Search ............... 65/3.11, 3.12, 13, 182; 427/163; 350/96.3, 96.33; 385/126, 128, 127, 146

[56] References Cited

U.S. PATENT DOCUMENTS

| | | | |
|---|---|---|---|
| 4,184,859 | 1/1980 | Maklad | 65/2 |
| 4,251,251 | 2/1981 | Blankenship | 65/3.12 |
| 4,360,371 | 11/1982 | Blankenship et al. | 65/3.12 |
| 4,378,985 | 4/1983 | Powers | 65/3.12 |
| 4,388,095 | 6/1983 | Schneider | 65/3.12 |
| 4,415,230 | 11/1983 | Keck | 350/96.33 |
| 4,453,961 | 6/1984 | Berkey | 65/3.12 |
| 4,493,530 | 1/1985 | Kajioka | 350/96.33 |
| 4,578,097 | 3/1986 | Berkey | 65/18.2 |
| 4,680,046 | 7/1987 | Matsuo | 65/3.11 |
| 5,000,773 | 3/1991 | LeNoane | 65/3.2 |

FOREIGN PATENT DOCUMENTS

| | | | |
|---|---|---|---|
| 0032390 | 7/1981 | European Pat. Off. | |
| 2551884 | 3/1985 | France | 65/3.12 |
| 2123810 | 2/1984 | United Kingdom | 65/3.11 |

OTHER PUBLICATIONS

Merriam-Webster; *Webster's Ninth New Collegiate Dictionary*, 1990, p. 97.

*Primary Examiner*—Robert L. Lindsay
*Attorney, Agent, or Firm*—W. J. Simmons, Jr.

[57] ABSTRACT

A method of making an optical fiber having an oblong core comprising the steps of depositing layers of core glass particles and cladding glass particles on an enlarged mandrel, removing the mandrel to form a tubular porous preform, consolidating the porous preform to form a dense glass preform, evacuating the central hole of the dense glass preform while stretching that preform to collapse the central hole thereof and form a flattened rod, applying cladding material to the rod, and drawing the resultant composite to form an optical fiber. To facilitate the flat collapse of the central hole of the dense glass preform and to cause the core to have a large aspect ratio, the inside diameter-to-outside diameter ratio of the dense glass preform should be within the range of 0.3 to 0.9. For preferred core and cladding glasses, this ratio should be between 0.5 and 0.6. Also, the mandrel diameter should be at least 12 mm, and it is preferably between 25 mm and 50 mm.

16 Claims, 2 Drawing Sheets

METHOD OF MAKING POLARIZATION RETAINING FIBER

BACKGROUND OF THE INVENTION

This invention relates to the fabrication of polarization retaining single-mode (PRSM) optical fibers and more particularly to the fabrication of preforms from which fibers having elliptically-shaped cores can be drawn.

In many applications of single-mode optical fibers, eg. gyroscopes, sensors and the like, it is important that the propagating optical signal retain the polarization characteristics of the input light in the presence of external depolarizing perturbations. This requires the waveguide to have an azimuthal asymmetry of the refractive index profile.

One of the first techniques employed for improving the polarization performance of single-mode fibers was to distort the symmetry of the core. One such optical fiber is disclosed in the publication by V. Ramaswamy et al., "Influence of Noncircular Core on the Polarization Performance of Single Mode Fibers", Electronics letters, Vol. 14, No. 5, pp. 143-144, 1978. That publication reports that measurements made on such fibers indicated that the noncircular geometry and the associated stress-induced birefringence alone were not sufficient to maintain polarization in single-mode fibers.

Fiber cores having a relatively high aspect ratio are required to obtain adequate polarization retaining properties. Techniques which were developed for improving core ellipticity are subject to various disadvantages. Some techniques are not commercially acceptable because of their complexity. Double crucible techniques result in fibers having relatively high attenuation. Some techniques employ very soft glasses for certain fiber portions, and those soft glasses are detrimental to the propagation of light at long wavelengths where the core glass would normally experience extremely low attenuation. Soft glasses can also complicate the fusion splicing of fibers, since the soft glass flows too readily when the fibers are heated during the splicing operation.

SUMMARY OF THE INVENTION

It is therefore an object of the invention to provide a method of making PRSM optical fibers which overcomes the disadvantages of the prior art. A further object is to provide a PRSM fiber producing method which is relatively simple to practice and which can employ glasses which do not detrimentally affect light attenuation.

In accordance with the present method, a PRSM fiber is formed by depositing consecutive coatings of core and cladding glass particles on a mandrel. The mandrel is removed to form a tubular porous preform which is consolidated to form a dense glass preform having a longitudinal aperture therethrough. The ratio of the inside diameter of the dense glass preform to the outside diameter thereof (ID/OD) is within the range of 0.3 to 0.9. The dense glass preform is stretched, and its aperture is simultaneously collapsed to form an elongated, flattened rod having an elliptically shaped core region. The step of stretching and collapsing may comprise evacuating the longitudinal aperture, heating an end of the dense glass preform, and stretching the heated end of the dense glass preform to collapse the aperture. Cladding material is applied to the rod, and an optical fiber is drawn therefrom.

The mandrel should have a diameter of at least 12 mm, and its diameter is preferably between 25 mm and 50 mm. A tubular mandrel is advantageous in that it cools quickly, and it withstands thermal shock. A tubular mandrel may surround an axially disposed rod which protrudes from both ends thereof, spacer means radially positioning the mandrel with respect to the rod. The mandrel may have an oblong cross-section to provide the preform with an aperture that readily collapses flat during the stretching step.

The preferred range of ID/OD ratios for silica fibers is between 0.5 and 0.6. This range can be lowered by lowering the softening point temperature of the coating of cladding glass particles by adding to the silica cladding one or more suitable dopants or by using non-silica cladding glasses. If a preform is too soft for a given ID/OD ratio, the resultant drawn rod can assume a curved cross-sectional shape.

DESCRIPTION OF THE PREFERRED EMBODIMENT

It is to be noted that the drawings are illustrative and symbolic of the invention, and there is no intention to indicate scale or relative proportions of the elements shown therein.

Figure 1:
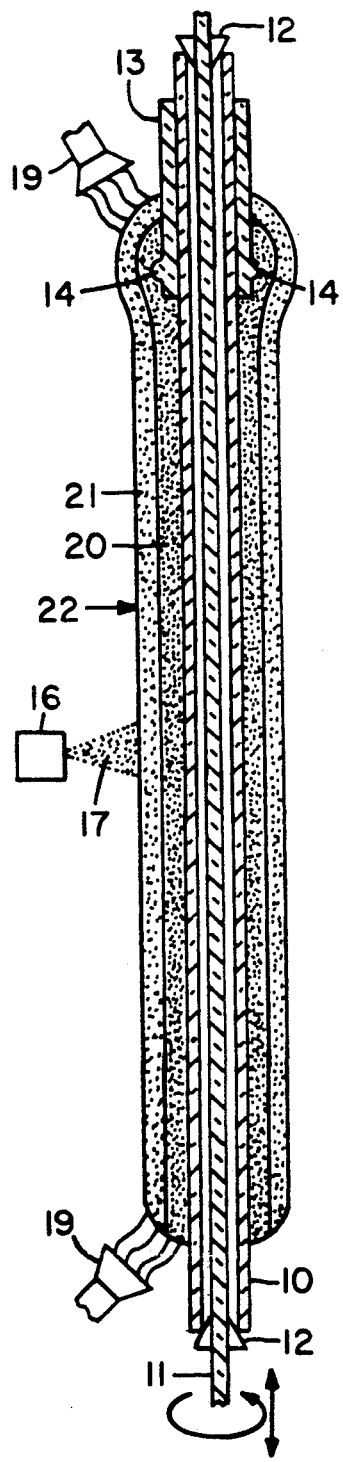
FIG. 1 illustrates the application of successive coatings of glass particles to a mandrel.

As shown in FIG. 1, a rod 11 extends through a tubular mandrel 10. The rod and tube are formed of refractory material of the type conventionally employed in the fabrication of optical fiber preforms; alumina is a preferred material. Since the present method requires a relatively large diameter mandrel, a tubular mandrel construction provides certain advantages, i.e. the mandrel cools faster, and it better withstands thermal shock. The outside diameter of mandrel 10 can be tapered to facilitate removal of the porous glass preform which will be formed thereon. Mandrel 10 is maintained coaxially with respect to rod 11 by wedging a resilient conical sleeve 12 between the rod and each end of tube 10. A glass tube 13 having protrusions 14 is positioned over one end of tube 10. The ends of rod 11 are mounted in a lathe (not shown) where it is rotated and translated as indicated by the arrows.

Figure 9:
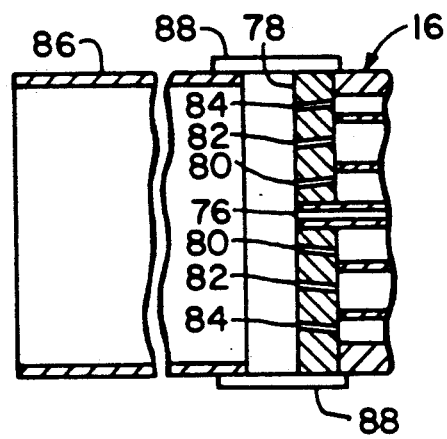
FIG. 9 is a fragmentary cross-sectional view of a conventional flame hydrolysis burner.

A flame hydrolysis burner, which may be employed as deposition means 16, is illustrated in FIG. 9. A centrally located orifice 76 in burner face 78 is surrounded by concentric rings of orifices 80, 82 and 84. Reactant compounds emanate from orifice 76 where they are subjected to heat from a flame produced by fuel gas and oxygen emanating from orifices 82. Oxidation of the reactant compounds within the flame forms a glass particle stream 17 of which is directed toward mandrel 10. An "inner shield" of oxygen emanates from orifices 80 to prevent the reaction of reactant compounds at the burner face. An "outer shield" stream of oxygen emanates from orifices 84. This burner design is somewhat similar to that disclosed in U.S. Pat. No. 3,698,936 issued to H.J. Moltzan, the Moltzan patent differing in that it teaches an annular slot for providing the inner shield stream and in that it lacks the outer shield orifices. All of the orifices of burner 16 are supplied by manifolds in a manner similar to that taught in the Moltzan patent. The axes of all burner orifices can be parallel, or the axes of orifices 80, 82 and 84 can be slightly angled or focused so gases emanating therefrom are directed toward the reactant compounds emanating from orifice 76.

Suitable means for delivering the gas-vapor mixture to the burner are disclosed in U.S. Pat. Nos. 3,826,560 and 4,314,837. One or more auxiliary burners 19 may be employed to direct a flame toward one or both ends of the porous glass preform during deposition. The use of auxiliary burners is taught in U.S. Patent No. 4,810,276.

Burner 16 is generally operated under conditions that will provide acceptably high laydown rates and efficiency while minimizing the buildup of glass particles on the burner face. Under such conditions, the flow rates of gases and reactants from the burner orifices and the sizes and locations of such orifices as well as the axial orientation thereof are such that a well focused stream of glass particles flows from the burner toward the mandrel. In addition, a cylindrically shaped shield 86, which is spaced a short distance from face 78 by brackets 88, protects the stream of glass particles from ambient air currents and improves laminar flow.

In the manufacture of optical fibers, the core and cladding materials should be produced from glasses having minimum light attenuation characteristics. Although any optical quality glass may be used, $SiO_2$ is a particularly suitable glass. The core and cladding glasses may be formed of the same base glass, and either or both of those glasses can be doped to cause the refractive index of the core to exceed that of the cladding. It is known that $B_2O_3$ and fluorine lower the refractive index of silica and that dopants such as oxides of titanium, tantalum, aluminum, lanthanum, phosphorus, germania and the like increase the refractive index thereof. The cladding may contain one of the aforementioned index increasing dopants provided that the core contains a sufficient amount of index-increasing dopant to increase the core index to a value greater than that of the cladding.

A porous preform 22 is formed by depositing on mandrel 10 a first coating 20 of core glass particles, a second coating 21 of cladding glass particles being applied over first coating 20. The refractive index of coating 21 is made lower than that of coating 20 by one of the above-described techniques. Each coating is formed by traversing mandrel 10 many times with respect to burner 16 to cause a build-up of many layers of glass particles. The burner may be caused to make additional passes in the vicinity of protrusions 14 in order to strengthen the bond between tube 13 and preform 22.

Cladding layer 21 forms the inner cladding region of the resultant optical fiber, and a subsequently applied cladding layer forms the outer region of the fiber. The composition (and thus softening point temperature) of cladding layer 21 has an effect on the ellipticity of the core. If the cladding base glass is a hard glass such as $SiO_2$, it may be desirable to dope cladding layer 21 with fluorine or $B_2O_3$ to provide that layer with a lower softening point temperature.

Figure 2:
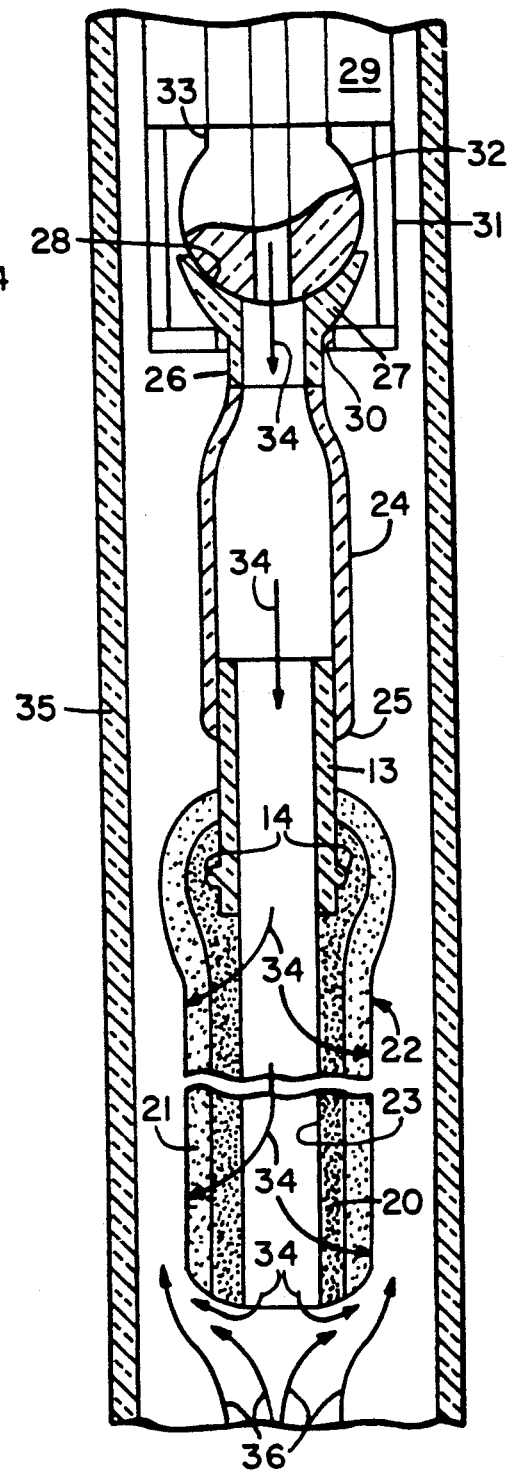
FIG. 2 is a partial cross-sectional view of a porous preform during the consolidation process.

After preform 22 has been deposited, mandrel 10 is removed through tube 13, thereby leaving a longitudinal aperture 23 in the porous preform. Protrusions 14 cause tube 13 to adhere to porous preform 22, whereby that tube provides support for subsequent processing. As shown in FIG. 2, tube 13 is inserted into the large diameter end of tapered glass tube 24 which is flame worked at end 25 thereof to form a sealed joint. A glass gas connection joint 27 having a cylindrically shaped cavity 28 is fused to the small diameter end of tube 24.

Figure 3:
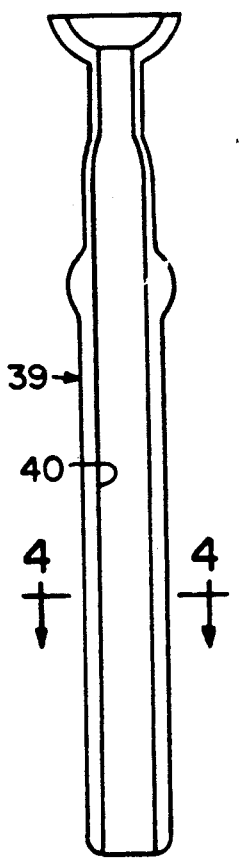
FIG. 3 is a cross-sectional view of a consolidated glass preform.
Figure 4:
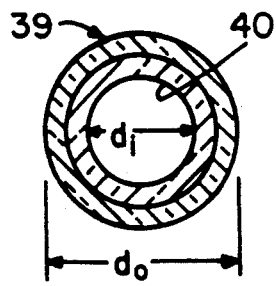
FIG. 4 is a cross-sectional view taken at lines 4—4 of FIG. 3.

During the consolidation process, preform 22 is suspended by a support such as a slotted handle formed in the end of tube 29. One side of end region 31 of tube 30 is removed to accept flared joint 27 as the adjacent small diameter section of tubing is inserted into slot 30. Ball joint 32, which is located at the end of gas conducting tube 33, is fits into the complementary cavity 28 of joint 27. Drying gas (arrows 34) is flowed through tube 33, into the aperture 23 and outwardly through the preform interstices as the preform is inserted into furnace muffle 35. Drying gas 34 may comprise an inert gas such as helium and a drying agent such as chlorine or the like. An inert flushing gas 36 such as helium, flows upwardly through muffle 35. The steps of drying and consolidating may be performed in accordance with the teachings of U.S. Pat. No. 4,125,388 (Powers 2A). Drying may be accomplished before or during the consolidation step. Consolidated, dried preform 39 is shown in FIG. 3.

The porous preform can be doped with fluorine in the consolidation furnace in accordance with the teachings of U.S. Pat. No. 4,629,485 (Berkey 4). In this embodiment, muffle 35 should consist of silica or a high silica content glass to resist the corrosive action of the fluorine. A fluorine containing atmosphere 36 flows upwardly through muffle 35 and over the surface of porous preform 22 where it flows inwardly through the preform interstices. Atmosphere 36 may comprise an inert gas and fluorine or a fluorine containing compound such as $SiF_4$, $C_2F_6$, $C_2F_2Cl_2$ and $CF_4$.

For certain glass compositions, conventional particle deposition techniques result in the formation of a devitrified layer on the surface of aperture 40 of the consolidated preform. The devitrified layer can be removed by flowing an etchant such as $SF_6$ through aperture 40. The etchant is preferably flowed before the preform cools appreciably from consolidation temperature.

Figure 5:
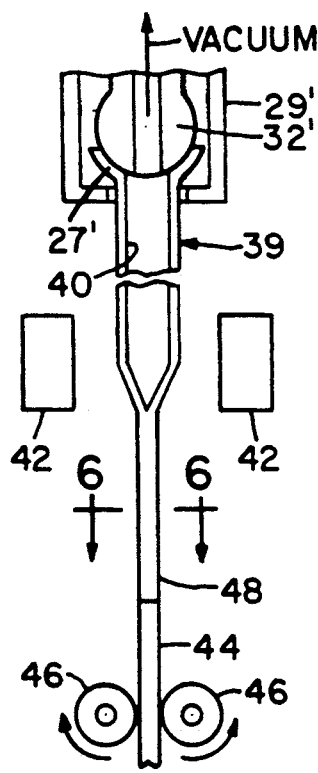
FIG. 5 is a schematic diagram illustrating the drawing of a rod from the consolidated preform.

Consolidated preform 39 is stretched and collapsed as shown in FIG. 5, wherein elements similar to those of FIG. 2 are represented by primed reference numerals. The stretching process forms a flattened rod 48 to which additional cladding glass can be applied. The apparatus of FIG. 5 is a conventional draw furnace wherein the tip of consolidated preform 39 is heated by resistance heater 42 to a temperature which is slightly lower than the temperature to which the preform would be subjected to draw optical fiber therefrom. A temperature of about 1900° C. is suitable for a high silica content preform. One end of glass rod 44 can be attached to the bottom of preform 36, and the other end can be engaged by motor-driven tractors 46, thereby causing rod 48 to be drawn from preform 39. Rod 48 comprises core portion 50 and cladding portion 52, portion 50 being slightly flatter in cross-section than portion 52. A draw rate of 15 to 23 cm/min has been found to be adequate. After the end of preform 39 has been stretched so that aperture 40 is either very narrow or completely closed, the aperture is evacuated through members 27' and 32'. As rod 48 is drawn, the aperture readily closes flat since the pressure therein is low relative to ambient pressure.

If the difference between the thermal coefficients of expansion of the core and cladding regions of consolidated preform 39 is sufficiently great, breakage can occur if the preform is permitted to cool to room temperature. This condition exists, for example, when the preform cladding is $SiO_2$ and its core comprises $SiO_2$ doped with about 13 weight percent $GeO_2$ or more. This problem can be overcome by stretching the preform before its temperature has decreased to the critically low value. If such a preform cannot be stretched immediately after it has been consolidated, it can be stored in a holding oven until it can be stretched.

Figure 7:
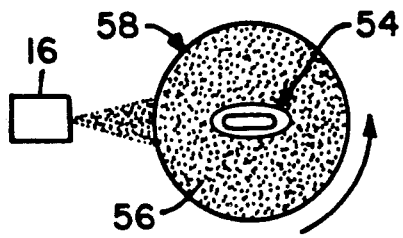
FIG. 7 illustrates the application of a coating of cladding glass particles to the rod produced by the method of FIG. 5.

Rod 48 is severed into a plurality of sections 54, each of which is sufficiently long to function as a mandrel on which additional cladding particles may be deposited. Section 54 is mounted in a lathe where it is rotated and translated with respect to burner 16. A coating 56 of cladding particles is thereby built up on the surface thereof to form composite preform 58 (FIG. 7).

Composite preform 58 is gradually inserted into a consolidation furnace through which a drying gas flows. The drying gas flows inwardly from the preform surface and through the interstices thereof to remove water prior to the time that consolidation occurs. A fluorine containing gas is optionally flowed along with the drying gas to dope coating 56 with fluorine.

Figure 8:
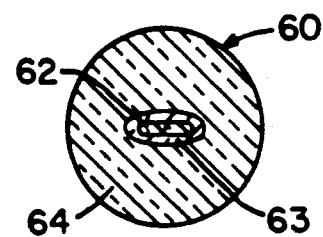
FIG. 8 is a cross-sectional view of the resultant polarization retaining single-mode fiber.

The resultant consolidated draw blank is mounted in a conventional draw furnace where it is drawn into a fiber 60 (FIG. 8) having an oblong core 62. Inner cladding region 63 and outer cladding region 64 can be formed of the same or different glass compositions. For example, the inner cladding could comprise $SiO_2$ and a sufficient amount of fluorine to lower the softening point temperature, whereas the outer cladding could consist of pure silica to simplify the outer cladding consolidation process.

An alternative method of applying the outer cladding region requires the insertion of a length 54 of rod 48 into a cylindrically shaped tube of cladding glass and the subsequent drawing of the composite structure to form a fiber. The lower end of the cladding tube is closed, whereby a the application of a vacuum to the upper end thereof causes the tube to collapse onto the oblong core rod.

Figure 6:
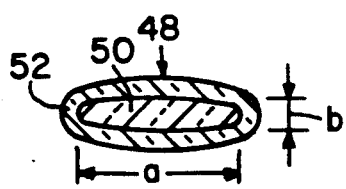
FIG. 6 is a cross-sectional view taken at lines 6—6 of FIG. 5.

The polarization retaining properties of the fiber are dependent upon the core aspect ratio, which is defined by the core thickness to width ratio a/b (see FIG. 6). The aspect ratio is determined by such factors as the mandrel diameter, the thickness of core layer 20, the total wall thickness and the compositions of the layers. In order to provide minimally acceptable polarization retention properties, a minimum aspect ratio of about 1:3 is required. Polarization retaining properties continue to improve until the aspect ratio reaches a value of about 1:5. It is noted that the aspect ratio of the outside of rod 48 is between about $\frac{1}{3}$ and $\frac{1}{4}$ times core aspect ratio a/b, i.e. rod 48 is much rounder than core portion 50.

It is preferred that the core coating 20 be formed of a sufficient number of layers that the core 62 of the resultant optical fiber 60 has uniform dimensions along the length thereof. The cladding coating 21 should be formed of a sufficient number of layers that the interface between cladding layers 63 and 64 is displaced a sufficient distance from the core that very little optical power reaches that interface. The minimum thickness of porous preform 22 should be about 6 mm ($\frac{1}{4}$ inch) to provide sufficient strength for handling.

For a specific consolidated preform 39, the ratio of inside diameter (of aperture 40) to outside preform diameter is determined by the diameter of mandrel 10 and the total thickness of preform 22. In accordance with the present invention that ratio, hereafter ID/OD, is between 0.3 and 0.9. The factors affecting that range and the preferred ID/OD range are discussed below.

In contrast with the present method, the mandrel diameter has been between 4 and 10 mm for conventional glass particle deposition processes. The diameter has been maintained relatively small to maximize the amount of glass particles that can be deposited per unit length of mandrel. The outside diameter of a porous preform is conventionally made no larger than the maximum size that can be accepted by conventional consolidation furnaces. This has limited the diameter of porous preforms to about 10 cm. Such constraints have resulted in the formation of consolidated glass core blanks wherein the ID/OD ratio has been in the range of about 0.04 and 0.1.

To increase the ID/OD ratio to at least 0.3 and yet maintain the preform thickness at an acceptable value, the diameter of the mandrel must be made greater than that of conventional mandrels. In accordance with the present invention the preferred range of mandrel diameters is between 25 mm and 50 mm. The maximum end of the preferred range is currently limited by the present size of such preform treating equipment as consolidation and redraw furnaces. Specially designed equipment could increase mandrel diameter. The minimum practical mandrel diameter is about 12 mm. A preform produced on a mandrel having a diameter less than 12 mm would consist of such a thin layer of particles that only a relatively short length of optical fiber could be formed therefrom. Such a process would not be economical.

If an optical fiber is to comprise a doped silica core and a silica cladding, the preferred ID/OD ratio is in the range of 0.5 to 0.6. If the softening point temperature of cladding layer 21 is made to be lower than that of silica, the ID/OD ratio can be lowered. If, for example, the cladding layer comprises silica doped with fluorine, the softening point temperature of the resultant glass will be slightly lowered, whereby the ID/OD ratio may be in the range of about 0.45 to 0.6. Since $B_2O_3$ has a greater effect on softening point temperature, its presence in cladding layer 21 will result in an ID/OD ratio in the range of 0.4 to 0.55. By using even softer glasses for cladding layer 21 (and optionally for core layer 20), it is expected that the lower end of the ID/OD ratio range can be extended to 0.3. Softer glasses might include silica containing combinations of dopants such as $B_2O_3$, $P_2O_5$, fluorine and the like. Other relatively soft glasses are non-silica glasses.

Figure 10:
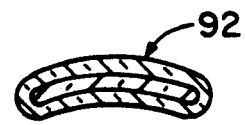
FIG. 10 is a cross-sectional view of a distorted collapsed preform rod.

If preform 36 is too soft for a given ID/OD ratio, the resultant drawn rod 92 may not be flat, but can assume a curved shape such as that of rod 92 (FIG. 10). It is the avoidance of such distortion that limits the upper end or the ID/OD range to 0.9.

Figure 11:
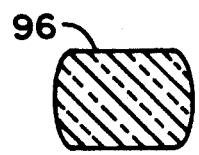
FIG. 11 is a cross-sectional view of a modified mandrel.

For a given ID/OD ratio, ellipticity is improved by employing a mandrel 96 that is elliptical or flattened as shown in FIG. 11. It is noted that FIG. 11 also illustrates that the mandrel can be solid. The elliptically shaped aperture of the resultant consolidated preform facilitates the flat collapse thereof. Flattened mandrels are difficult to make. If the corners are not perfectly smooth, the resultant preform can contain seeds.

The following specific examples illustrate the manner in which the method of the present invention can be employed to produce PRSM optical fibers.

A tubular alumina mandrel 10 having a 31.7 mm inside diameter was positioned over a 6.4 mm alumina rod 11. The outside diameter of mandrel 10 was tapered from 37 mm to 35 mm over its 850 cm length. Conically shaped rubber sleeves were wedged between the rod and tube at both ends of the tube. A glass tube 13 having protrusions 14 thereon was positioned over one end of tube 10. The ends of rod 11 were mounted in a lathe where it was rotated and translated.

A burner of the type illustrated in FIG. 9 was positioned 13.7 cm from mandrel 10. During the deposition of the entire preform, oxygen flowed from inner shield orifices 80 and outer shield orifices 84 at 2.3 slpm (standard liters per minute) and 1.1 slpm, respectively. During the formation of coatings 20 and 21, the flow of methane and oxygen from orifices 82 was 10 slpm and 4 slpm, respectively.

Liquid $SiCl_4$ was maintained at 79° C. in a first container, and liquid $GeCl_4$ was maintained at 100° C. in second container, thus producing vapor at about 20 psi. The burner traversed a 49 cm section of mandrel in 25 seconds. An acetylene torch supported on the burner was first employed to deposit carbon particles on the mandrel during one burner pass to facilitate removal of the porous preform.

EXAMPLE 1

For a period of one hour, $SiCl_4$ and $GeCl_4$ vapors were metered from the first and second containers at rates of 0.4 slpm and 0.7 slpm, respectively. These flows, along with 3 lpm oxygen, were conveyed to burner orifice 76. Thus, a step-index core region of $SiO_2$ doped with 30 weight percent $GeO_2$ was deposited. The flow of $GeCl_4$ from the second container was then stopped while the flow of $SiCl_4$ from the first container was increased to 1.0 slpm, the oxygen flow remaining at 3 slpm. The flow of $SiCl_4$ continued for 200 minutes during which time $SiO_2$ particles was deposited to form the cladding region of the preform.

The preform was removed from the lathe, and the mandrel was removed therefrom, tube 13 remaining at one end thereof. Tapered glass tube 24 and joint 27 were attached to tube 13 as described above.

The preform was then dried and consolidated in accordance with the teachings of U.S. Pat. No. 4,629,485. A drying gas consisting of 5 volume percent chlorine and 95 volume percent helium was flowed through members 27, 32 and 33 and tubes 13 and 24 and into the preform aperture. As the preform was lowered into the silica consolidation furnace muffle, a flushing gas consisting of 5 volume percent $SiF_4$ and 95 volume percent helium flowed upwardly through the muffle. The resultant consolidated, dried preform 39 contained 1.5 wt. % fluorine. The preform remained in the consolidation furnace while aperture 34 was etched by flowing $SF_6$ therethrough.

In order to measure the ID/OD ratio of consolidated core preforms, they were sawed to reveal their cross-section. Sawing a preform usually caused sufficient cracking to render it useless. The ID/OD ratio was therefore measured on only a few of each type of preform. The ID/OD ratio of consolidated preforms of the type produced by the method of Example 1 was between about 0.5 and 0.55.

Consolidated preform 39 was inserted into a draw furnace, and a ball joint 32', which was connected to a vacuum source, was butted against joint 27'. One end of a silica rod was fused to the lower end of the preform, and the other end of the rod was engaged by tractors 46. As the lower end of the preform was drawn and its diameter decreased, aperture 40 was evacuated through joints 27' and 32', thereby collapsing stretched portion 48. The preform was heated to about 1960° C. and pulled downwardly at a rate of about 15 cm/min. As rod 48 was drawn, aperture 34 closed flat. The maximum and minimum dimensions of the core region 50 of rod 48 were not measured because of the risk of damaging it; core region dimensions of this type of rod are typically 3.2 mm by 0.8 mm.

A 90 cm section was severed from rod 48 and was supported in a lathe where it functioned as a mandrel for the deposition of additional cladding glass particles. $SiCl_4$ vapor was metered from the first container at a rate of 1.0 slpm, and this vapor was combined with 3 slpm oxygen and flowed to the burner which traversed rod 54 at a rate of about 2 cm/sec. This was continued until a layer of $SiO_2$ having an outside diameter of 60 mm was deposited to form a composite preform 58.

The resultant composite preform was gradually inserted into a consolidation furnace having a maximum temperature of 1450° where it was consolidated while a mixture of 99.5 volume percent helium and 0.5 volume percent chlorine flowed upwardly through the furnace muffle. The resultant consolidated draw blank, the diameter of which was about 35 mm, was inserted into a draw furnace where the tip thereof was subjected to a temperature of about 2100° C. The draw blank was drawn to form a polarization retaining single-mode fiber having an oblong core, the dimensions of which were 2 $\mu m$ by 6 $\mu m$.

The resultant fiber exhibited an attenuation of 0.9 dB/km at 1300 nm. The polarization characteristics were such that the fiber exhibited a beat length of 2.6 mm at 1300 nm with a 30 dB extinction ratio on a 1 km length of fiber as measured on a 37 cm diameter measurement drum.

EXAMPLE 2

The purpose of this comparative example is to show that similar optical properties can be obtained by varying the glass softening point temperature and the ID/OD ratio.

An optical fiber was formed in accordance with Example 1 except that the following changes were made. Core glass particles were deposited on the mandrel for 40 minutes, and a coating of $SiO_2$ particles was deposited for 180 minutes.

The resultant porous preform 22 was not doped with fluorine during the consolidation process. The flushing gas consisted of pure helium, and the flow of chlorine and helium to the preform aperture the same as in Example 1. The ID/OD ratio of consolidated preforms made in accordance with this example was about 0.6. The combined effect of the lack of fluorine in the cladding coating 21 and the higher ID/OD ratio resulted in the formation of a core region 50 the dimensions (and also aspect ratio) of which were essentially the same as those of the rod 48 produced in Example 1.

A 90 cm section of rod 48 was overcoated with additional silica cladding glass particles as described in Example 1 to form a composite preform 58 having an outside diameter of 60 mm. The resultant composite preform was consolidated and drawn as described in Example 1 to form a polarization retaining single-mode fiber, the core dimensions of which were 2 μm by 6 μm. The attenuation and beat length of the fiber were essentially the same as those of the fiber produced by the method of Example 1.

I claim:

1. A method of making a single-mode optical fiber having at least one polarization retaining property, said method comprising the steps of
    depositing a coating of core class particles on a tubular mandrel having a diameter of at least 12 mm,
    depositing a coating of cladding glass particles on the surface of said core glass coating,
    removing said mandrel from said coatings of core and cladding particles to form a tubular porous preform,
    consolidating said tubular porous preform to form a dense glass preform having a longitudinal aperture therethrough, the ratio of the inside diameter of said dense glass preform to the outside diameter thereof being within the range of 0.3 to 0.9,
    stretching said dense glass preform and collapsing said aperture, thereby forming an elongated, flattened rod having an elliptically shaped core region,
    applying cladding material to said rod to form a draw blank, and
    drawing said draw blank to form a polarization retaining single-mode optical fiber having an elliptically-shaped core, said at least one polarization retaining property of said fiber being determined by the aspect ratio of said core.

2. The method of claim 1 wherein the step of stretching and collapsing comprises simultaneously evacuating said longitudinal aperture, heating an end of said dense glass preform, and stretching the heated end of said dense glass preform to collapse said aperture, thereby forming an elongated, flattened rod having an eliptically shaped core region.

3. A method of making a single-mode optical fiber having at least one polarization retaining property, said method comprising the steps of
    depositing a coating of core glass particles on a mandrel having a diameter between 25 and 50 mm,
    depositing a coating of cladding glass particles on the surface of said core glass coating, the combined thickness of said coatings of core and cladding glass being at least 6 mm,
    removing said mandrel from said coatings of core and cladding particles to form a tubular porous preform,
    consolidating said tubular porous preform to form a dense glass preform having a longitudinal aperture therethrough, the ratio of the inside diameter of said dense glass preform to the outside diameter thereof being within the range of 0.3 to 0.9,
    stretching said dense glass preform and collapsing said aperture, thereby forming an elongated, flattened rod having an elliptically shaped core region,
    applying cladding material to said rod to form a draw blank, and
    drawing said draw blank to form a polarization retaining single-mode optical fiber having an elliptically-shaped core, said at least one polarization retaining property of said fiber being determined by the aspect ratio of said core.

4. The method of claim 3 wherein the step of consolidating comprises forming a dense glass preform wherein ratio of the inside diameter to the outside diameter thereof is within the range of 0.5 to 0.6

5. The method of claim 3 wherein the step of depositing a coating of core glass particles comprises depositing a layer of doped $SiO_2$ particles and the step of depositing a coating of cladding glass particles comprises depositing $SiO_2$ particles, and wherein the ratio of the inside diameter of said dense glass preform to the outside diameter thereof is within the range of 0.5 to 0.6.

6. The method of claim 3 wherein the step of depositing a coating of cladding glass particles comprises depositing fluorine-doped $SiO_2$ particles comprises depositing fluorine-doped $SiO_2$ particles, and wherein the ratio of the inside diameter of said dense glass preform to the outside diameter thereof is within the range of 0.45 to 06.

7. The method of claim 3 wherein the step of depositing a coating of cladding glass particles comprises depositing $B_2O_3$-doped $SiO_2$ particles, and wherein the ratio of the inside diameter of said dense glass preform to the outside diameter thereof is within the range of 0.4 to 0.55.

8. The method of claim 3 wherein the step of depositing a coating of cladding glass particles comprises depositing $SiO_2$ particles, and wherein the ratio of the inside diameter of the dense glass preform to the outside diameter thereof is within the range of 0.5 to 0.6.

9. The method of claim 3 wherein the step of depositing a coating of cladding glass particles on a mandrel comprises depositing particles that are formed of silica and a dopant that lowers the softening point temperature of said cladding glass particles.

10. The method of claim 9 wherein the step of depositing a coating of cladding glass particles on a mandrel comprises depositing particles comprising silica and a dopant selected from the group consisting of $B_2O_3$ and fluorine.

11. The method of claim 2 wherein the step of depositing a coating of core glass particles comprises depositing a layer of doped $SiO_2$ particles and the step of depositing a coating of cladding glass particles comprises depositing $SiO_2$ particles, and wherein the ratio of the inside diameter of said dense glass preform to the outside diameter thereof is within the range of 0.5 to 0.6.

12. A method of making a polarization retaining single-mode optical fiber comprising the steps of
    depositing a coating of core glass particles on a mandrel, the cross-section of which, in a plane perpendicular to the axis of said mandrel, is oblong,
    depositing a coating of cladding glass particles on the surface of said core glass coating, removing said mandrel from said coatings of core and cladding particles to form a tubular porous preform, consolidating said porous preform to form a dense glass preform having a longitudinal aperture therethrough, stretching said dense glass preform and collapsing said aperture, thereby forming an elongated, flattened rod having an elliptically shaped core region, applying cladding material to said rod, and drawing the composite of said rod and said cladding material to form a polarization retaining single-mode optical fiber.

13. The method of claim 12 wherein the step of stretching and collapsing comprises simultaneously evacuating said longitudinal aperture, heating an end of said dense glass preform, and stretching the heated end of said dense glass preform to collapse said aperture, thereby forming an elongated, flattened rod having an elliptically shaped core region.

14. A method of making a single-mode optical fiber having at least one polarization retaining property, said method comprising the steps of depositing a coating of core glass particles on a tubular mandrel of refractory material having a diameter of at least 12 mm, said tubular mandrel surrounding a refractory rod which is coaxial with said mandrel and which protrudes from both ends thereof, and spacer means radially positioning said mandrel with respect to said rod, depositing a coating of cladding glass particles on the surface of said core glass coating, removing said mandrel from said coatings of core and cladding particles to form a tubular porous preform, consolidating said tubular porous preform to form a dense glass preform having a longitudinal aperture therethrough, the ratio of the inside diameter of said dense glass preform to the outside diameter thereof being within the range of 0.3 to 0.9, stretching said dense glass preform and collapsing said aperture, thereby forming an elongated, flattened rod having an elliptically shaped core region, applying cladding material to said rod to form a draw blank, and drawing said draw blank to form a polarization retaining single-mode optical fiber having an elliptically-shaped core, said at least one polarization retaining property of said fiber being determined by the aspect ratio of said core.

15. A method of making a single-mode optical fiber having at least one polarization retaining property, said method comprising the steps depositing a coating of core glass particles on a tubular mandrel of refractory material having a diameter of at least 12 mm, said tubular mandrel surrounding a refractory rod which is coaxial with said mandrel and which protrudes from both ends thereof, and spacer means radially positioning said mandrel with respect to said rod, depositing a coating of cladding glass particles on the surface of said core glass coating, removing said mandrel from said coatings of core and cladding particles to form a tubular porous preform, consolidating said tubular porous preform to form a dense glass preform having a longitudinal aperture therethrough, the ratio of the inside diameter of said dense glass preform to the outside diameter thereof being within the range of 0.3 to 0.9, stretching said dense glass preform and collapsing said aperture, thereby forming an elongated, flattened rod having an elliptically shaped core region, applying cladding material to said rod to form a draw blank, and drawing said draw blank to form a polarization retaining single-mode optical fiber having an elliptically-shaped core, said at least one polarization retaining property of said fiber being determined by the aspect ratio of said core.

16. A method of making a polarization retaining single-mode optical fiber comprising the steps of depositing a coating of doped $SiO_2$ core glass particles on a tubular mandrel of refractory material having a diameter between 25 mm and 50 mm, said tubular mandrel surrounding a refractory rod which is coaxial with said mandrel and which protrudes from both ends thereof, and spacer means radially positioning said mandrel with respect to said rod, depositing a coating of $SiO_2$ cladding glass particles on the surface of said core glass coating, said coatings of core and cladding particles having a combined thickness of at least 6 mm, removing said mandrel from said coatings of core and cladding particles to form a tubular porous preform, consolidating said tubular porous preform to form a dense glass preform having a longitudinal aperture therethrough, the ratio of the inside diameter of said dense glass preform to the outside diameter thereof being within the range of 0.3 to 0.9, stetching said dense glass preform and collapsing said aperture, thereby forming an elongated, flattened rod having an elliptically shaped core region, applying $SiO_2$ cladding material to said rod to form a draw blank, and drawing said draw blank to form a polarization retaining single-mode optical fiber.

* * * * *